No. 873,807. PATENTED DEC. 17, 1907.
M. H. SULLIVAN.
PISTON AND PISTON PACKING.
APPLICATION FILED JULY 2, 1906. RENEWED JUNE 8, 1907.
2 SHEETS—SHEET 1.
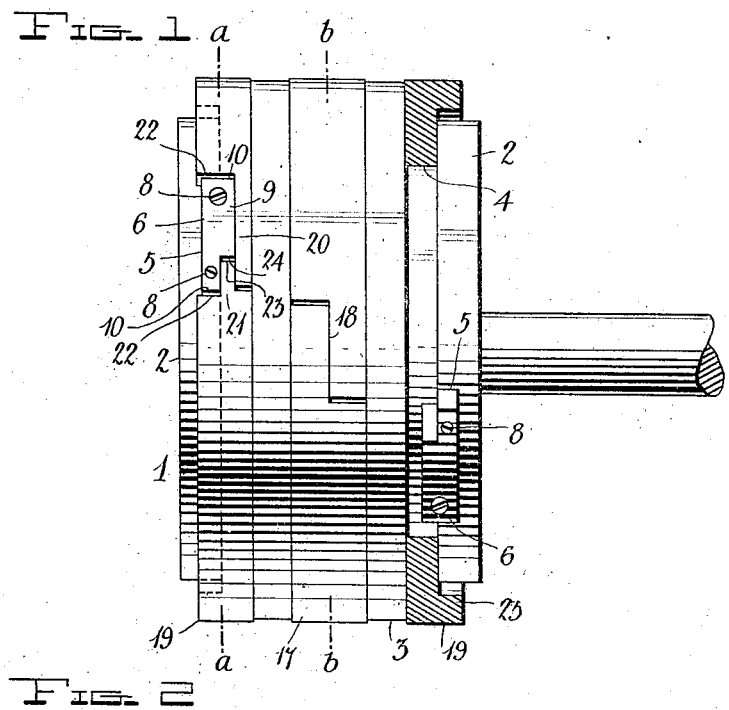
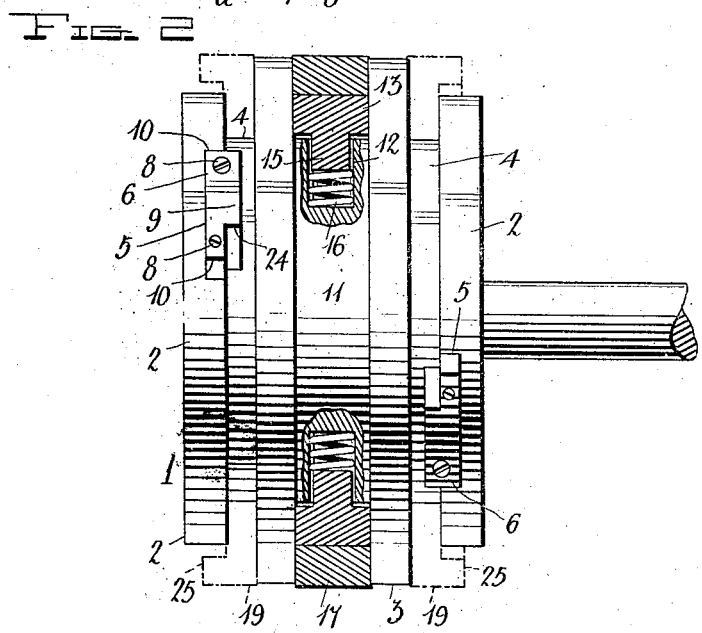
Witnesses
Inventor
Michael H. Sullivan
by Benj. G. Cowl
Attorney No. 873,807. PATENTED DEC. 17, 1907.
M. H. SULLIVAN.
PISTON AND PISTON PACKING.
APPLICATION FILED JULY 2, 1906. RENEWED JUNE 8, 1907.
2 SHEETS—SHEET 2.
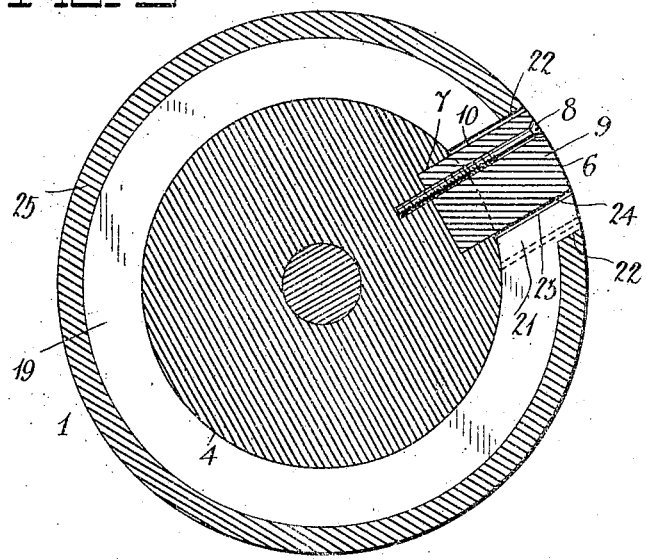
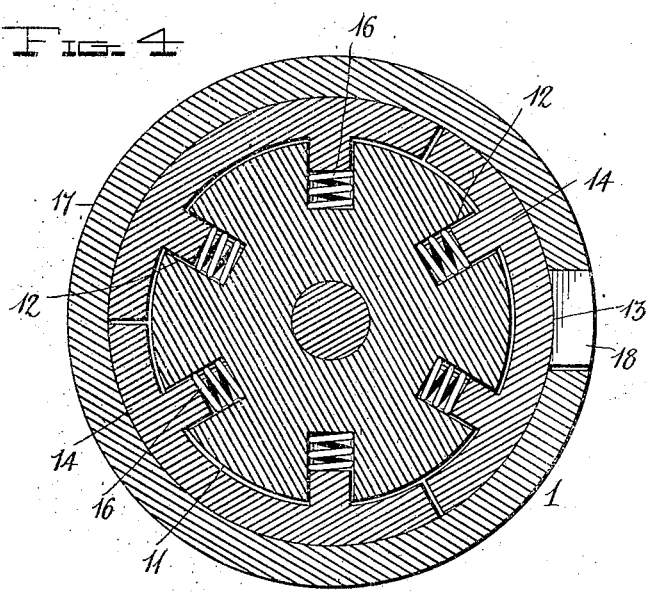
Witnesses
Inventor
Michael H. Sullivan
by Benj. G. Cowl
Attorney

UNITED STATES PATENT OFFICE.

MICHAEL H. SULLIVAN, OF POUGHKEEPSIE, NEW YORK.

PISTON AND PISTON-PACKING.

No. 873,807.     Specification of Letters Patent.     Patented Dec. 17, 1907.

Application filed July 2, 1906, Serial No. 324,380. Renewed June 8, 1907. Serial No. 378,004.

*To all whom it may concern:*

Be it known that I, MICHAEL H. SULLIVAN, a citizen of the United States, residing at Poughkeepsie, in the county of Dutchess and State of New York, have invented new and useful Improvements in Pistons and Piston-Packings, of which the following is a specification.

My invention relates to improvements in pistons and piston packings for use in the cylinders of steam and other engines, and also adapted for use in pumps and similar machines, and it consists in the construction, combination and arrangement of devices hereinafter described and claimed.

One object of my invention is to effect improvements in the construction of the piston and of the steam rings and to combine therewith fixed stops carried by the piston and which coact with the overlapped ends of the steam rings to prevent the latter from turning on the piston and to also facilitate the entrance of the steam between the ends of such rings to enable the steam pressure to diametrically expand such rings and fit them snugly in the cylinder with minimum friction thereon.

A further object of my invention is to effect improvements in the construction of the piston and to combine therewith a novel form of carrying ring and expanding ring which act to center the piston in the cylinder.

In the accompanying drawings,—Figure 1 is a side elevation of a piston provided with my improved packing devices, one of the steam rings being shown in transverse section; Fig. 2 is a similar view of the same with the steam rings indicated in dotted lines and the carrying and centering rings indicated in transverse section; Fig. 3 is a transverse sectional view, taken on the plane indicated by the line *a—a* of Fig. 1; and Fig. 4 is a similar view, taken on the plane indicated by the line *b—b* of Fig. 1.

The piston 1 has its end portions 2 reduced in size diametrically as compared with the central portion 3. The said reduced end portions of the piston are provided with annular circumferential grooves 4, in the outer side of each of which is a radial recess 5 to receive a stop piece 6. Said stop pieces also extend into recesses 7 formed in the piston and are here shown as secured in place by means of screws 8. Any suitable means may be employed to secure the stop pieces in place and I do not limit myself in this particular. Each stop piece has a portion 9 which projects partly across the groove 4, and the ends of which form shoulders 10.
The central portion 3 of the piston is provided with an annular peripheral groove 11 of suitable depth and is provided with radial recesses 12, which communicate with said groove 11. In the said groove 11 is placed a centering ring 13, which is composed of separate segmental sections 14 of any suitable number, three being here shown. The said segments of the centering ring are provided with inwardly-extending studs 15 which enter the outer portions of the radial recesses 12. Springs 16, here shown as coiled extensile springs, are also in the said recesses and bear between the bottoms thereof and the ends of the said studs and exert outward radial tension on the segments of the centering ring, as will be understood. On the outer side of the centering ring and in the groove 11 is an open carrying ring 17, the ends of which break joints with certain of the segments of the centering ring and are recessed in opposite sides so that they overlap, as shown at 18 in Fig. 1. This carrying ring bears directly against the walls of the cylinder and the tension and strength of the springs 16 are such as to cause said springs to hold the piston concentric with reference to the cylinder under all conditions.

Where the piston is in use in an upright engine, the springs 16 will be all of the same strength, but where the piston is in use in a horizontal or inclined engine, such springs 16 as are on the lower side thereof must be of greater strength than the upper springs and of sufficient strength to support the weight of the piston and overcome the gravitating tendency thereof to bear on the lower side of the bore of the cylinder.

The steam rings 19 are placed in the groove 4. The said steam rings are open rings, each having its ends recessed in one side and overlapped, as at 20, 21, the portions 20 being longer than the portions 21 to provide recesses for the reception of the stop pieces 6, which project radially from the reduced portions of the piston and present shoulders 22 to coact with the end shoulders 10 of the stop pieces and to provide the end portions 21 with shoulders 23 to coact with the shoulders 24 on the inner, laterally-projecting sides of said stop pieces.

It will be understood that the stop pieces act to prevent the steam rings from turning on the piston and that the shoulders thereof coact with the shoulders formed at the overlapped portions of the steam rings to admit steam in the spaces between said shoulders to cause said steam rings to be expanded. The said steam rings are also provided in their outer sides with laterally-extending flanges 25, which overhang and are spaced from the reduced portions of the piston and enable the steam in the cylinder to act on said steam rings to expand the same and cause them to effectually pack the piston in the cylinder with minimum friction thereon.

The various parts of my improved backing device may be of any suitable material or materials and I do not desire to limit myself in this particular. Neither do I desire to limit myself to the precise construction herein set forth, as it is evident that modifications may be made therein without departing from the spirit of my invention as defined by the appended claims.

Having thus described my invention, what I claim as new, and desire to secure by Letters-Patent, is,—

1. In combination with a piston having a reduced portion, an annular circumferential groove in said reduced portion, and a recess at the bottom and one side of said groove, a stop detachably secured in said recess and projecting into one side of the groove, and a steam ring in said groove having a laterally-extending flange and provided with recesses for the reception of said stop.

2. A piston having an annular circumferential groove, in combination with a segmental centering ring in the bottom of said groove, said piston and ring having segmental guiding devices, springs to move the segments of said ring outwardly, and an expansible carrying ring on the segmental ring, substantially as described.

3. In combination with a piston having an annular, circumferential groove and a stop in one side of said groove and projecting radially from said piston, a steam ring in said groove having its ends overlapped and recessed for the reception of said stop, substantially as described.

4. A piston having an annular, circumferential groove and radial recesses communicating with the bottom of said groove, in combination with a segmental centering ring in the bottom of said groove and having studs extending into said recesses, springs to normally move said segments of said centering ring outwardly, and an open carrying ring in said groove on said centering ring and having overlapped ends, substantially as described.

In testimony whereof I have signed my name to this specification in the presence of two subscribing witnesses.

MICHAEL H. SULLIVAN.

Witnesses:
JAMES E. CARROLL,
JOHN E. MACK.